United States Patent
Mulac et al.

(10) Patent No.: US 12,197,899 B1
(45) Date of Patent: Jan. 14, 2025

(54) DISTRIBUTED FUNCTIONAL MODULES INTEGRABLE IN MULTIPLE APPLICATIONS

(71) Applicant: THE HUNTINGTON NATIONAL BANK, Columbus, OH (US)

(72) Inventors: Patrick A. Mulac, Columbus, OH (US); Adam Parker, Columbus, OH (US)

(73) Assignee: THE HUNTINGTON NATIONAL BANK, Columbus, OH (US)

(*) Notice: Subject to any disclaimer, the term of this patent is extended or adjusted under 35 U.S.C. 154(b) by 0 days.

(21) Appl. No.: 18/768,900

(22) Filed: Jul. 10, 2024

(51) Int. Cl.
*G06F 8/35* (2018.01)
*G06F 8/38* (2018.01)
*G06F 9/451* (2018.01)

(52) U.S. Cl.
CPC .................. *G06F 8/38* (2013.01); *G06F 8/35* (2013.01); *G06F 9/451* (2018.02)

(58) Field of Classification Search
CPC .............. G06F 8/35; G06F 8/38; G06F 9/451
See application file for complete search history.

(56) References Cited

U.S. PATENT DOCUMENTS

| 8,261,231 | B1 * | 9/2012 | Hirsch | G06F 8/36 |
| | | | | 717/121 |
| 11,922,143 | B1 * | 3/2024 | Shapiro | G06F 8/35 |
| 2021/0232374 | A1 * | 7/2021 | Weibel | G06F 11/34 |

OTHER PUBLICATIONS

P. Pannuto et al., "A Modular and Adaptive Architecture for Building Applications with Connected Devices," 2018 IEEE International Conference on Industrial Internet (ICII), Seattle, WA, USA, 2018, pp. 1-12 (Year: 2018).*

* cited by examiner

*Primary Examiner* — Hanh Thi-Minh Bui
(74) *Attorney, Agent, or Firm* — Kilpatrick Townsend & Stockton LLP (57) ABSTRACT

Techniques are described herein for modularized components related to a host application rendered on a user device. For example, a technique may include receiving a first modular interactive UI feature and a second modular interactive UI modular feature. The first modular interactive UI feature may include first code and the second modular interactive UI feature may include second code that is executable independent of the first code. The first modular interactive UI feature may be configured to perform a first function and the second modular interactive UI feature may be configured to perform a second function that is distinct from the first function.

16 Claims, 6 Drawing Sheets

DISTRIBUTED FUNCTIONAL MODULES INTEGRABLE IN MULTIPLE APPLICATIONS

BACKGROUND

Applications (e.g., web-based applications or mobile applications) have become increasingly complex and may contain multiple user interface (UI) elements. These UI elements may be interactive and may provide various functionalities to a user. However, the increase in elements contained within a single application leads to challenges in security, consistency in user experience, and managing various aspects of the UI elements.

SUMMARY

Aspects of the disclosed technology include a method for rendering a user interface (UI) with modularized components. The method may include receiving a first modular interactive UI feature and a second modular interactive UI modular feature, the first modular interactive UI feature may include the first code and the second modular interactive UI feature may include the second code that may be executable independent of the first code, where the first modular interactive UI feature may be configured to perform a first function and the second modular interactive UI feature may be configured to perform a second function that may be distinct from the first function. The method may include storing the first modular interactive UI feature and the second modular interactive UI feature on a cloud platform, the first modular interactive UI feature and the second modular interactive UI feature being associated with a standardized enterprise system. The method may include enabling access to the first modular interactive UI feature and the second modular interactive UI feature on the cloud platform by a plurality of host applications hosted by the standardized enterprise system. The method may include receiving, from a host application executing on a user device, a request that identifies the first modular interactive UI feature and the second modular interactive UI feature, the host application may include host application content and configured to perform the first function and the second function. The method may include responsive to the request, fetching from the cloud platform and providing to the user device, the first code corresponding to the first modular interactive UI feature and the second code corresponding to the second modular interactive UI feature, where the first code causes the host application to enable the first function and the second code causes the host application to enable the second function. Other embodiments of this aspect include corresponding computer systems, apparatus, and computer programs recorded on one or more computer storage devices, each configured to perform the actions of the methods.

Aspects of the disclosed technology may include any combination of the following features. The method where the first modular interactive UI feature and the second modular interactive UI feature may be modified independently of one another on the cloud platform. The cloud platform may be public cloud. The first modular interactive UI feature and the second modular interactive UI feature may be fetched at runtime of the host application via a request received at a load balancer of the cloud platform. The method may include updating the first interactive UI feature on the cloud platform by replacing the first modular interactive UI feature with a new version of the first modular interactive UI feature containing new code. The method may include receiving, from the host application executing on the user device, an additional request that identifies the first modular interactive UI feature; and responsive to the additional request, fetching from the cloud platform, and providing to the user device, the new code corresponding to the new version of the first modular interactive UI feature. The first code and the second code may be configured to cause an interaction with a backend server to retrieve or send data. The method may include verifying the first modular interactive UI feature and the second modular interactive UI feature fetched from the cloud platform using a token-based authentication. The method may include blocking, by a load balancer, transmission of the first modular interactive UI feature responsive to an indication received by the cloud platform that the first modular interactive UI feature contains specific features related to a security vulnerability. The method may include storing multiple versions of each of the first modular interactive UI feature and the second modular interactive UI feature on the cloud platform. The method may include rolling back to a previous version of the first modular interactive UI feature or the second modular interactive UI feature in response to receiving, at the cloud platform, a message indicating a security vulnerability with a current version of the first modular interactive UI feature or a current version of the second modular interactive UI feature. Implementations of the described techniques may include hardware, a method or process, or computer software on a computer-accessible medium.

Aspects of the disclosed technology include a method for rendering a user interface (UI) with modularized components. The method may include receiving, from an application server and by the user device, a first host application, the first host application may include code and references to a first modular interactive UI feature and a second interactive UI modular feature, the first modular interactive UI feature may include first code and the second modular interactive UI feature may include second code that may be executable independent of the first code, where the first modular interactive UI feature may be configured to perform a first function and the second modular interactive UI feature may be configured to perform a second function that may be distinct from the first function. The method may include instantiating, on the user device, the first host application. The method may include transmitting, to a cloud platform, a request for the first modular interactive UI feature and the second modular interactive UI feature, the request based on the code of the first host application. The method may include receiving, from the cloud platform and by the user device, the first modular interactive UI feature and the second modular interactive UI feature. The method may include executing, on the user device and as part of the first host application, the first code to provide the first function and the second code to provide the second function. Other embodiments of this aspect include corresponding computer systems, apparatus, and computer programs recorded on one or more computer storage devices, each configured to perform the actions of the methods.

Aspects of the disclosed technology may include any combination of the following features. The method may include receiving a user input with respect to the first modular interactive UI feature. The method may include transmitting, a request to a first computing system based on the first code, the request to the first computing system transmitted responsive to the user input with respect to the first modular interactive UI feature. The third modular interactive UI feature may be configured to perform a third function and the fourth modular interactive UI feature may be configured to perform a fourth function that may be distinct from the third function; instantiating, on the user device, the second host application; transmitting, to the cloud platform, an additional request for the third modular interactive UI feature and the fourth modular interactive UI feature, the additional request based on the additional code of the second host application; receiving, from the cloud platform and by the user device, the third modular interactive UI feature and the fourth modular interactive UI feature; and executing, on the user device and as part of the second host application, the third code to provide the third function and the fourth code to provide the fourth function. Implementations of the described techniques may include hardware, a method or process, or computer software on a computer-accessible medium.

Aspects of the disclosed technology include a non-transitory computer-readable medium containing instructions. The non-transitory computer-readable medium containing instructions may include receiving a first modular interactive user interface (UI) feature and a second modular interactive UI modular feature, the first modular interactive UI feature may include the first code and the second modular interactive UI feature may include the second code that may be executable independent of the first code, where the first modular interactive UI feature may be configured to perform a first function and the second modular interactive UI feature may be configured to perform a second function that may be distinct from the first function. The instructions may include storing the first modular interactive UI feature and the second modular interactive UI feature on a cloud platform, the first modular interactive UI feature and the second modular interactive UI feature being associated with a standardized enterprise system. The instructions may include enabling access to the first modular interactive UI feature and the second modular interactive UI feature on the cloud platform by a plurality of host applications hosted by the standardized enterprise system. The instructions may include receiving, from a host application executing on a user device, a request that identifies the first modular interactive UI feature and the second modular interactive UI feature, the host application may include host application content and configured to perform the first function and the second function. The instructions may include responsive to the request, fetching from the cloud platform and providing to the user device, the first code corresponding to the first modular interactive UI feature and the second code corresponding to the second modular interactive UI feature, where the first code causes the host application to enable the first function and the second code causes the host application to enable the second function. Other embodiments of this aspect include corresponding computer systems, apparatus, and computer programs recorded on one or more computer storage devices, each configured to perform the actions of the methods.

Aspects of the disclosed technology may include any combination of the following features. The non-transitory computer-readable medium containing instructions the operations may include updating the first interactive UI feature on the cloud platform by replacing the first modular interactive UI feature with a new version of the first modular interactive UI feature containing new code. The non-transitory computer-readable medium containing instructions the operations may include: receiving, from the host application executing on the user device, an additional request that identifies the first modular interactive UI feature; and responsive to the additional request, fetching from the cloud platform, and providing to the user device, the new code corresponding to the new version of the first modular interactive UI feature. The non-transitory computer-readable medium containing instructions the operations may include storing multiple versions of each of the first modular interactive UI feature and the second modular interactive UI feature on the cloud platform. The first modular interactive UI feature and the second modular interactive UI feature can be modified independently of one another on the cloud platform. Implementations of the described techniques may include hardware, a method or process, or computer software on a computer-accessible medium.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The complexity of applications has increased as the size, set of functionalities provided by the applications, quality of the user interface, and security related code provided by the applications has improved. One example of an application may be a web application which provides various functionalities. The application may generally be related to an entity (e.g., a service provider, a resource provider, a bank, a government agency, etc.) and/or for a specific purpose (e.g., to order goods or services, conduct transactions, review personal information, etc.). Each application may have multiple functionalities which are all included within the one application. For example, large monolithic applications such as a Retail Online (ROL) or a Online Account Opening (OAO) applications incorporate numerous technical functionalities. Any changes to a specific technical function may necessitate the deployment, building, and testing of the entire application, which is cumbersome and time-consuming.

Currently, applications are typically provided to a user device in a single file. The application typically integrates all components (e.g., graphics, logos, multimedia components), features (e.g., one or more functionalities) and code (e.g., executable code, scripts, application programming interface (API) instructions to access external resources, etc., which may be related to providing the functionality) into a single module. The application may be contained within the single module. The single module may be hosted on a server computer, and may be received at one or more client devices via known deployment and downloading methods.

However, as the various components related to a specific application are all contained within a single module, any change to a single functionality contained within the specific application may necessitate a change to the entire module. Thus, the specific application is monolithic, which provides little to no flexibility as it relates to making updates. For example, if the specific functionality within the single module requires a change, the entire module will need to be replaced. For example, a security update to the specific feature may require the code related to that feature, and other dependencies related to that code (e.g., API calls, relations to other features, elements called by the code, etc.) to be updated. This can set off a chain of "update" events that extends far beyond the security updates. Existing approaches may have included fragmenting or otherwise siloing certain features. However, these approaches may be cumbersome to manage and may have their own drawbacks such as high development overhead and processing overhead to operate.

Thus, rather than that specific feature (e.g., a specific functionality) becoming unavailable, the entire application may become unavailable and inaccessible to a user. Additionally, the process of making a change to a single feature, which may be shared across multiple applications, may require making the change to that feature as created across all applications in which the feature is present. This process may not only replicate efforts but may not ensure that the change to the feature is made consistently for that feature across multiple applications which may contain that feature.

Additionally, various aspects related to any feature included in the application may not be consistently applied across applications, including those that are sourced from the same provider. Such aspects may include visual elements (e.g., font and visuals), interactive elements (e.g., how a user may interact with the feature), and/or presentation elements of the feature (e.g., how data may be displayed, stored, downloaded, etc.).

The above-discussed limitations are further exacerbated as applications become more complex, containing dozens, hundreds, or even thousands of individual functionalities. These features are often developed separately based on subject-matter expertise related to the functionalities. For example, each feature may contain specific requirements related to privacy, security, localization (e.g., different versions for different geographical or political regions), and accessibility (e.g., colors, text-size, voice accessibility, etc.).

Thus, there is a need to provide an alternative framework in which feature-rich applications may be updated while overcoming the above-described, and other limitations.

Aspects of the disclosed technology provide for one or more modular features which may be stored, enabled, transmitted, requested, fetched, etc. independent of one another. The modular features may be configured to be integrated into a host application. The host application may independently request each modular feature at runtime. Each modular feature may further be accessed independently of other modular features. Each modular feature may also include specific code. The code of a particular modular feature may be executed on a user device independent of other code from another modular feature. Each modular feature may be integrated into more than one host application. In some examples, a feature may provide a specific functionality that may be independently deployable and incorporated into a host application. The feature may be interactive and provide the specific functionality through one or more inputs and/or interactions with a user. In some examples, a feature may be considered to be a modular portion of an application or a portion of the functionality of a full application. In some examples, functionality provided by a particular application or a particular module may overlap with the functionality provided by another application or another module.

In the event of a change to a specific modular feature (e.g., at an enterprise level), the modular feature may be updated, and provided to an access device (e.g., a server device, a cloud platform, a dedicated server, etc.) for the updated modular feature to be included. The host application, which may be calling the specific modular feature, may avoid being modified while the change and/or update to the specific modular feature may be implemented. For example, a first modular feature may be changed to reflect a change in security policies for code which is included within the first modular feature. A second modular feature may be updated to reflect changes to the style, formatting, and other compliance requirements for the second modular feature. A third modular feature may be updated to reflect changes to local compliance (e.g., General Data Protection Regulation (GDRP), regional compliance, etc.).

In some examples, a specific modular feature may be deactivated or made inaccessible to a user device by removing the modular feature from the user device. For example, a first modular feature (e.g., modular feature A) may be deactivated while a second modular feature (e.g., modular feature B) may remain accessible. This may be achieved through modification of a cloud environment, such as for example, through modification of properties of a load balancer within a cloud environment. By selective activation and deactivation of modular features, the host application may remain accessible while the particular feature which is deactivated is modified. An updated or current version of the deactivated feature may be provided to the host device, and be made accessible or reactivated. Subsequent access to the host application may later then retrieve the updated version of the previously deactivated feature. Thus, full functionality of the host application may be restored without the host application being entirely unavailable while a particular feature is being updated or otherwise modified.

Turning now to a particular example, in this example, there is provided a server which may contain multiple applications which may be provided to one or more user devices, such as mobile phones, laptops, or other devices. As a non-limited example, the multiple applications may be a delivery application (e.g., a webpage to setup a delivery) and an insurance application. The delivery application may reference more than one features which may be provided as modular features. For example, the delivery application may include an identity verification feature, an address feature, a payment feature, a checkout feature, an inventory feature, a delivery scheduling feature, etc. Each of these features may be provided in the delivery application as individual modules. Each module may be hosted on a cloud platform. Upon the delivery application being executed on a user device, the delivery application may request those features from the cloud platform.

Similarly, the insurance application may also be requested from the server. The insurance application may reference features, some of which may be overlapping with the features which are contained in the delivery application. For example, the identity verification feature, the address feature, and/or the payment feature may be shared between the applications. The insurance application and the delivery application may be instantiated on the same user device. The insurance application and the delivery application may be provided to multiple user devices at the same time, which may all be operated by different users. Each application which is running on a user device may request features from a cloud environment. Thus, each user device which has instantiated an application (e.g., the insurance application or the delivery application) may receive its own copy of the modular features which are referenced in the respective applications.

The modular features (e.g., the identity verification feature, the address feature, the payment feature, the checkout feature, the inventory feature) may be transmitted from the cloud to each respective application requesting the feature. Each feature may contain code which may allow the feature to perform a respective function on the device. For example, the payment module may provide functionality to allow a user to provide input to make a payment (e.g., enter a credit card, provide a digital currency, link a bank account to transfer funds). The payment module may communicate with other servers, computing devices, applications, and/or user devices to perform its function. For example, a user device may use an API to communicate with a server controlled by a bank or a payment processor to perform this function.

The techniques described herein, including those described in the particular example, may provide multiple technical improvements, benefits, and advantages with respect to prior solutions. For example, conventionally the delivery application and the insurance application would be maintained with all of the code and functionality in a single file (e.g., a single container) on a single server. Thus, any change which needs to be made to the application would require a modification of the entire file. No flexibility is possible in making updates to the applications. For example, if the specific functionality within the single module requires a change, the entire module will need to be replaced. For example, a security update to the specific feature may require the code related to that feature, and other dependencies related to that code (e.g., API calls, relations to other features, elements called by the code, etc.) to be updated. Additionally, one or more features may cause the application to not function as intended. Further, a specific feature may need to be selectively enabled or disabled. For example, a specific feature may need to be disabled due to a security problem with a server related to that specific feature. A conventional monolithic application does not allow this flexibility. However, by using modularized components which are referenced by an application (e.g., the delivery application or the insurance application), the specific component may be modified without modifying the entire application. Further, the application may still be accessible in a "live" environment and provided to user devices while only the specific feature being modified (e.g., updated) is made inaccessible. Additionally, the size of an application may be made smaller as compared to a monolithic application, allowing for the application to be provided more quickly and to a larger number of user devices simultaneously, while also conserving storage resources on the devices and the server and bandwidth resources needed for downloading. Additionally, the application may be configured to provide or fetch a feature on demand, lowering the bandwidth, memory, and processing required to render the application. Furthermore, the security of the application may be improved by allowing each modular feature to be maintained separately. For example, a security issue with a single feature (e.g., a compromised server, a compromised API) may be contained and not include user data, information, and/or other information on a user device and/or other servers in communication with the user device. Each feature may have different requirements in terms of privacy, security, encryption, and/or handling user information. Thus, each feature may be examined for meeting the requirements that relate to that feature rather than the entire application being compliant with the requirement which may be placed on only one feature.

As discussed in further detail below, the following systems and methods illustrate exemplary implementations of the disclosed technology. In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1A:
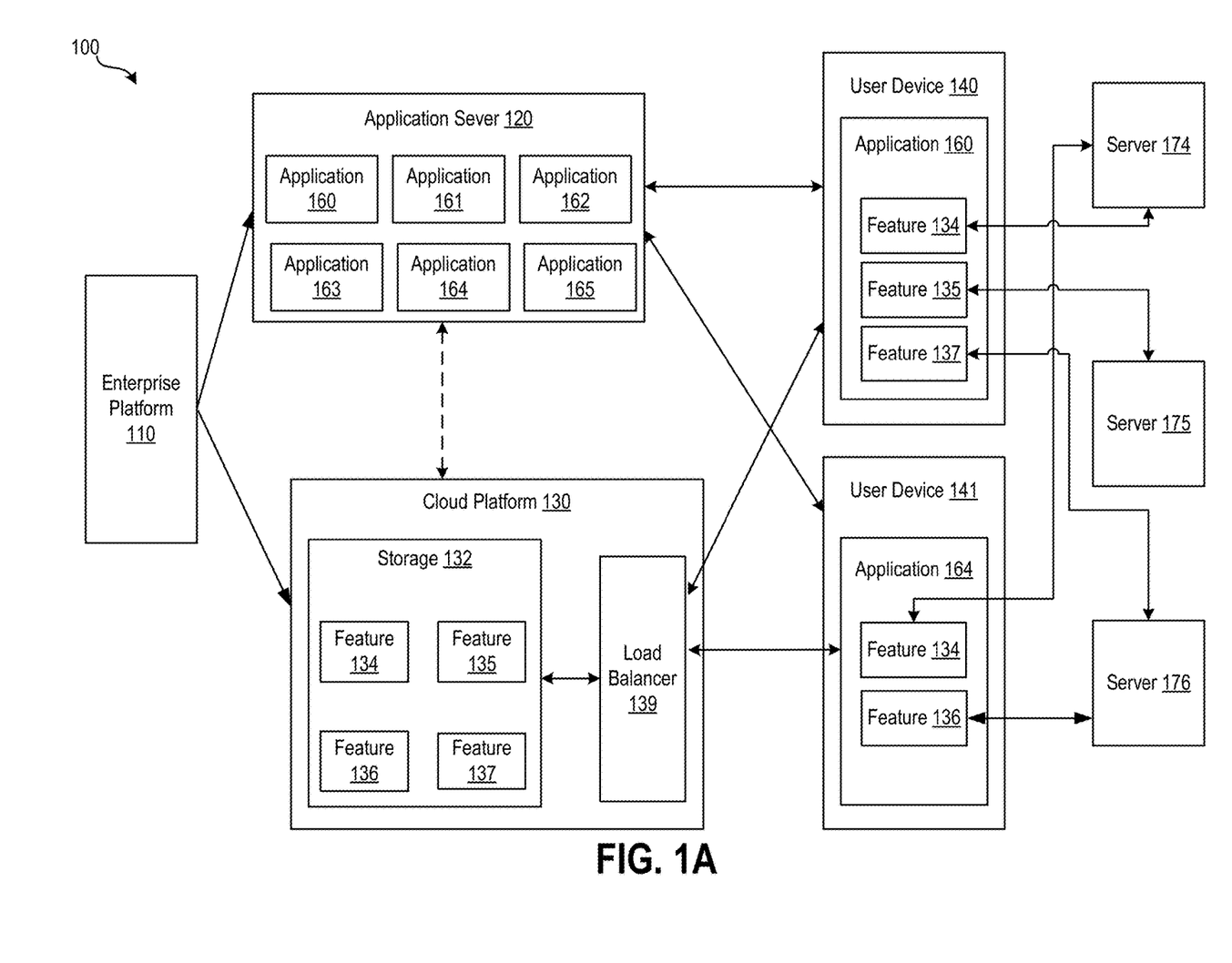
FIG. 1A is an example architecture for providing modularized UI features, 100, in accordance with at least one embodiment.
Figure 1B:
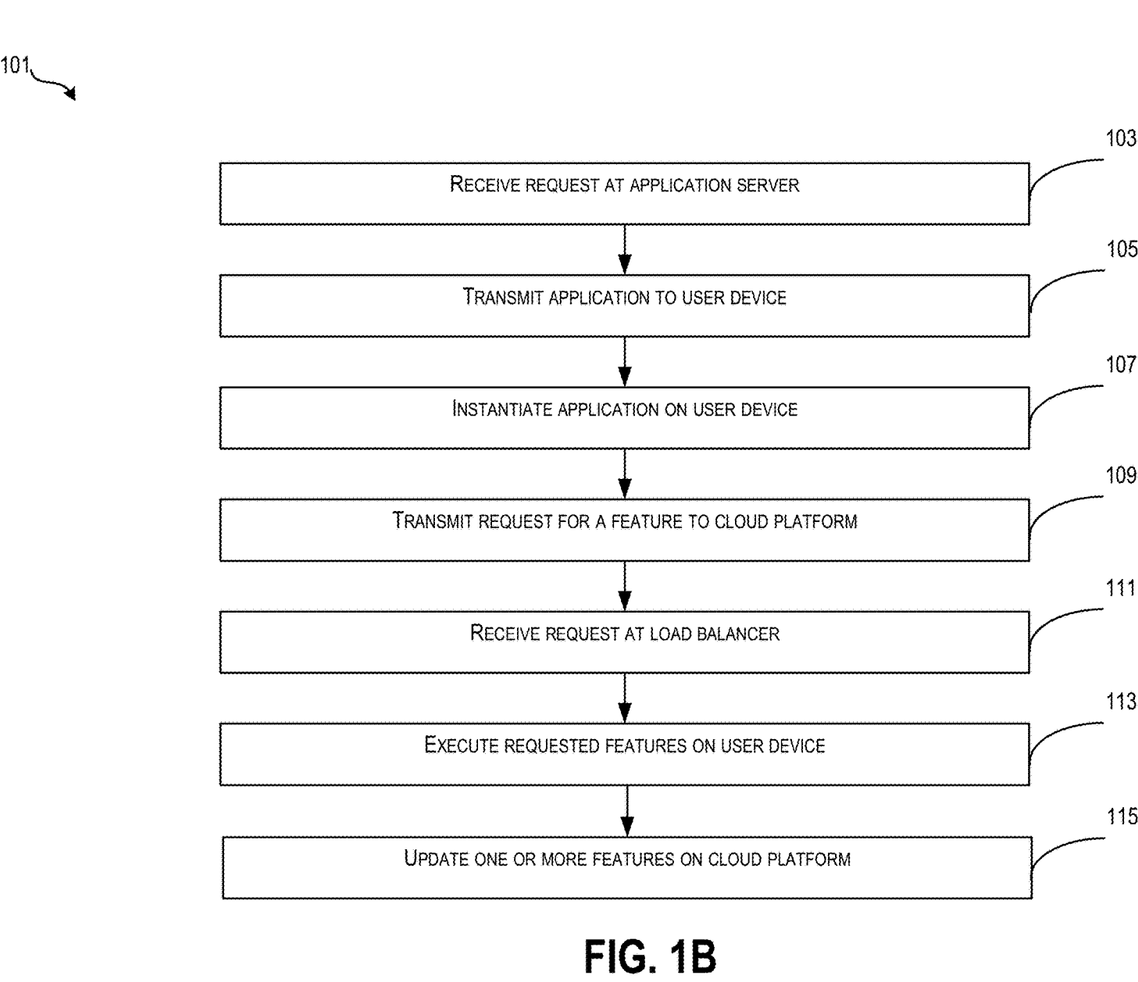
FIG. 1B is an example flow illustrating a process for providing modularized UI features, 101, in accordance with at least one embodiment.

FIG. 1A is an example architecture for providing modularized UI features, 100, in accordance with at least one embodiment. FIG. 1B is an example flow illustrating a process for providing modularized UI features, 101, in accordance with at least one embodiment.

Illustrated in FIG. 1A is an architecture 100. The architecture 100 may include an enterprise platform 110, an application server 120, a cloud platform 130, user devices 140-141, and servers 174-176. The application server 120 may host applications 160-165. Cloud platform 130 may contain a storage 132 storing features 135-137. The storage 132 may be accessible through a load balancer 139. In some examples, the application server 120 and the cloud platform 130 may be separate components. However, in some examples, the application server 120 and the cloud platform 130 may have overlapping components, be instantiated as separate virtual machines on a virtual cloud environment, or be the same server and/or platform.

The enterprise platform 110 may be a platform which may be used for the development, management, and/or deployment of one or more applications and/or features related to the one or more applications. The enterprise platform 110 may contain a combination of hardware and/or software components which may allow for the development, troubleshooting, versioning, deployment, testing, and security analysis of the example applications and features described herein.

The application server 120 may be a computing device or a collection of distributed computing devices which are configured to provide various services and functionalities to other components within the architecture 100. The application server 120 may include hardware and software elements that may enable it to process requests, manage data, and facilitate communication between one or more devices. The application server 120 may include localized servers, distributed servers, and/or virtual servers (e.g., cloud-based servers, virtual computers, etc.). In some examples, the application server 120 may be part of a server cluster, where multiple servers work together to handle increased loads. This may include load balancing mechanisms.

The application server 120 may contain one or more processors, memory, network interfaces, input/output ("I/O") interfaces, etc. The application server 120 may also contain software, including operating systems, application software, middleware, versioning software, database management systems, etc. The application server 120 may also receive and process requests from client devices, which may include web browsers, mobile applications, and other agents. These requests may be interpreted by the application server 120, which may execute the operations necessary to respond to the request which has been received.

The application server 120 may also contain data management functionality. This may include the ability to manage data storage, retrieval, and manipulation. The application server 120 may interact with one or more databases to store various aspects related to the applications, such as versions, a permission list, user permissions, regional variations, etc. The application server 120 may also contain session management capabilities. For example, the application server 120 may provide session states for connected clients. This may ensure continuity, authenticate user devices, etc.

Applications 160-165 may be exemplary applications which are stored and provided on application server 120. Although only a limited number of applications are illustrated on the application server 120, it may be understood that any number of applications may be stored on the application server for distribution to one or more user devices. The applications 160-165 may be web applications. Each application of the applications 160-165 may each contain a set of functionalities which differs from the functionalities of other applications. For example, the application 161 may be a financial application; the application 162 may be an application to conduct a transaction; the application 163 may be related to verifying an identity of a user; the application 164 may be related to the use of blockchain; and the application 165 may be related to resources related to foreign exchange.

The applications 160-165 may contain client-facing (e.g., front end) components as well as server side (e.g., back-end) components. For example, with respect to the client-facing components, the applications 160-165 may contain a user interface, user experience modules, and real-time interaction modules. The user interface may be built using HTML5, CSS3, JavaScript, and frameworks such as React.js and/or Angular. These components may allow for dynamic rendering of the user interface. The user experience modules may ensure that adaptive layouts may be followed, such as by implementing standards such as Accessible Rich Internet Applications (ARIA). Real-time interaction modules may use or contain components such as WebSockets and/or Server-Sent Events (SSE) for real-time data updates and notifications. The back-end may include server facing frameworks (e.g., Django or customized files), an API layer (e.g., RESTful, GraphQL API, etc., which may be used for communication between a client and server), and other logic. Other components may be included for authentication, such as Open Authentication (OAuth), JWT (JSON Web STokens), OpenID Connect etc.

Although not illustrated on the application server 120, each application may have one or more features which are included and/or referenced in the applications 160-165. These features are further discussed below. In some examples, the application server 120 may be configured to communicate with the cloud platform 130. For example, one or more applications on the application server 120 may periodically communicate with the cloud platform 130 to verify one or more aspects of features stored on the cloud platform 130.

The cloud platform 130 may be a virtual private cloud (VPC), a physical private cloud platform, a public cloud platform, or other cloud platform (e.g., a hybrid platform with elements being hosted on a public platform and other elements being hosted on a private platform). A virtual private cloud may allow for an isolated network environment, in which the resources of the cloud platform 130 may be accessed by a user. The cloud platform 130 may contain multiple physical machines, servers, and/or virtual machines, which may be accessible or configured by a user of the cloud platform 130 as a single machine or resource. The cloud platform 130 may be distributed geographically across data centers and/or sites to ensure high reliability, accessibility, and resilience. Users may deploy software, run databases, manage networks, store data, scale up or down resources, perform computations, instantiate and/or stop operating systems, virtual machines, or other applications. The cloud platform 130 may be provided as an infrastructure as a service (Iaas), platform as a server (PaaS), or a software as a service (Saas).

For clarity, other components of the cloud platform 130 are not illustrated. This includes one or more APIs which may be used internally within the cloud platform 130.

The cloud platform 130 may include a storage 132, which may include features 134-137. The storage 132 may be a database or database service which may include and provide access to a feature. The storage 132 may be utilize a block storage system, file storage system, and/or a object storage system. The storage 132 may incorporate additional features, such as data encryption, versioning of data, and lifecycle management.

The features 134-137 may be interactive elements, which may be incorporated into an application. The features 134-137 may be interactive elements, which may be configured to perform one or more functions (e.g., accessing additional servers, transmitting information, performing defined functions (e.g., user authentication, encrypting information, securely uploading data, securely downloading data, etc.). Each feature may be configured to transmit information to one or more computing devices (e.g., servers) to perform the functions (e.g., servers 174-176). Each feature may additionally have multiple versions or variations to account for accessibility, compliance requirements, and security requirements. For example, certain versions of a specific feature may not be available in certain geographical regions. For example, a request for a specific feature may be blocked based on a geographic region determined based on an IP address of a user device.

The features 134-137 may further include code. The code may be configured to perform any of the functions for which the features are designed. The code may further be configured to provide uniformity with respect to a user interface. The code contained within the features 134-137 may further cause the application to generate a user interface. The user interface may be used to perform a function. Each feature may be modular. Thus, each feature may be modified and/or updated independently of other features. Additionally, the code for each feature may be run independently of other features, allowing each feature to independently perform functions. For example, the feature 134 may relate to a chatbox, the feature 135 may relate to a drop-down menu, the feature 136 may relate to a voice input, and the feature 137 may relate to a document upload functionality.

The storage 132 may be accessed through a load balancer 139. The load balancer 139 may receive one or more requests for access to one or more resources of the cloud platform 130. The load balancer may manage requests and/or traffic for web applications, APIs, and other services, and balance these requests across servers, virtual machines, and/or containers. The load balancer 139 may dynamically distribute traffic and/or demands placed on the cloud platform 130 to help meet requirements placed on the cloud platform 130.

The user devices 140-141 may be devices which may be operated by a user and may request one or more of applications 160-165, such as for example, cellular phones, laptops, smart-phones, desktops, servers, virtual machines, tablets, electronic readers, etc. The user devices 140-141 may include hardware components, including one or more processors, cache memory, volatile memory (e.g., random access memory), non-volatile memory, specialized processors, network interfaces (e.g., Wi-Fi, cellular, ethernet, Bluetooth), input/output devices (e.g., keyboard, touchscreens), and power sources (e.g., chemical batteries, capacitors). The user devices 140-141 may also contain software to allow a user to request one or more of the applications 160-165. This may include, for example, a web browser. The user devices 140-141 may be in data communication with the application server 120 and the cloud platform 130.

Illustrated in the user device 140 is the application 160. The application 160 may be received from the application server 120. The application 160 may contain references, links, and/or pointers to one or more features. For example, the application 160 contains features 134, 135, and 137. Features 134, 135, and 137 may be requested from the cloud platform 130 by the user device 140 responsive to a request which may be initiated by the application 160. The features may include a portion of the functionality and/or user interface provided by the application 160. However, as each feature is modularized, the application 160 may be instantiated and run on the user device 140 regardless of the availability of any specific feature associated with the application 160. Similarly, illustrated in user device 141 is the application 164, which may contain feature 134 and feature 136. For example, if the feature 135 is unavailable, the application 160 may still provide the functionality related to the features 134 and 137.

In some examples, features may be shared across applications. For instance, the feature 134 is shared between the application 160 and the application 164. The sharing of features across multiple applications may allow the feature to be modified by the enterprise platform 110, and for the change to be implemented across multiple applications. Additionally, the user interface of generated by each feature may be made consistent across the multiple applications.

Each feature may be associated with a server, such as servers 174-176. The servers 174-176 may be computing systems which may provide various servers and be in data communication with the user devices 140-141. Each server may be associated with a provider, resource, or service which is associated with each feature. The respective features may be configured to communicate with respective servers. For example, the feature 134 may be associated with server 174, the feature 135 with the server 175, and the feature 136 with the server 176.

In some examples, a feature team may manage the code and integration of a feature into a production environment. For example, the code for a particular feature may be included within a test environment of the enterprise platform 110. The development of the feature may require registries, test requirements, libraries, and repositories to develop, test, and produce a production ready version of the feature. The feature, once ready, may be pushed into the cloud platform 130 as a production version of the feature. In some examples, a first entity may control and/or manage a first feature while another entity may control and/or manage a second feature. Thus, the modularized features may be controlled and/or stored by multiple entities. In some examples, the various features may be stored on different cloud environments, which may be controlled and/or managed by the respective entity creating the respective feature.

As the enterprise platform 110 may control the distribution of both the applications 160-165 and the features 134-137, each application and each feature may be independently modified. This may increase the reliability of applications while providing a rich set of features.

FIG. 1B illustrates a process 101 according to examples of the disclosed technology. The process 101 may be performed on one or more components of the framework 100 described above. The framework 100 can be used to create usable APIs and modularized components. For example, currently, each application is individually handling security and login functionality. Through the use of the framework described, a login user interface (e.g., a login widget) may be used which is made available across an enterprise. The login user interface may be modularized and provided to multiple applications. Thus, any change in the security, visual rendering, access list, etc. related to the login user interface, made be performed only once. Further, the change is completely transparent to the applications which have integrated this modular feature. Additionally, any security risk posed by any portion of the functionality may be remediated without affecting the functionality of applications and/or features which are not a security risk. Using again the example of the login user interface, the interface may be disabled until a security risk related to the login user interface is resolved. This may include, for example, a risk to an external server associated with the login user interface feature. Similarly, another feature may be a shipping feature, where shipping information may be entered. Another example of a feature may be a checkout feature, wherein a checkout of an order can be made.

At 103, a request for an application may be received at an application server. For example, a request may be initiated by the user device 140 for the application 160. Similarly, a request may be initiated by the user device 141 for the application 164. The user devices may also request other applications from the application server 120.

At 105, an application may be transmitted to a user device. For example, the application server 120 may transmit the application 160 responsive to the request from the user device 140. Similarly, the application server 120 may transmit the application 164 from the application server 120. The applications 160 and 164 may contain code which is configured to be rendered on the user devices.

At 107, the application may be instantiated on the user device. The instantiation may include the user device 140 executing the code of the application 160. The instantiation may include executing code of the application 160 which may include requests for one or more features which may be included in the application 160. Similarly, the user device 141 may execute the code of the application 164.

At 109, requests for one or more features may be transmitted to a cloud platform. For example, the user device 140 may transmit a request for the features 134, 135, and 137. Similarly, the user device 141 may transmit a request for the features 134 and 136. The requests may be received at the cloud platform 130. The requests may further be received and/or processed by the load balancer 139. The requested features may be provided to one or more user devices through one or more communication channels and/or network interfaces of the user device.

In some examples, an application may cause a request for a different version of a feature to be requested and/or accessed responsive to a user input (e.g., changing a region by a user, requesting an accessibility enhanced version of the application, inputting a user's age). In some examples, a "default" version of a feature may first be provided to the application. At a later stage, an alternative version of the features may be requested by the application. In some examples, the latest version of a feature (e.g., the last stable version release) may be automatically fetched and/or set as the default version of the feature to be obtained. In some examples, versions of a feature may be enhancements, bug fixes, etc. An application may also be configured to fetch a specific version of a feature, which may be guaranteed to be "fixed", and thus may not be subject to be changed.

At 113, the requested features may be executed on the user device. Each feature may contain code which is instantiated or run by the respective application on the respective user device. In some examples, the application running may include generating a user interface based on the feature. The user interface may provide one or more functions. In some examples, a user input may be required to utilize a function which may be made accessible through the user interface.

At 115, one or more features may be updated on a cloud platform. For example, a feature may be updated based on one or more requirements. For instance, a security issue with a particular feature may require changing aspects of that feature. This may include, for example, malicious code, a compromised API, run-time vulnerabilities, etc. The feature may be encapsulated within a container, which may be transmitted to the cloud platform. This container may contain all the code to recognize the feature and/or to transmit the feature to the user device.

As one example of using the framework 100, consider a payments team at an enterprise may that develop a payments application. The team, which focuses on payments-related functionalities, can develop a payments UI feature using the above framework 100. Once developed, the UI feature may be deployed to its own infrastructure, including a server. The modular UI can then be easily integrated into various host applications, ensuring that any updates or changes to the payments functionality do not require redeploying the entire application. This method streamlines the deployment process, reduces the risk of introducing errors, and allows for more frequent updates to specific business functionalities. By implementing this system, a scalable and efficient solution for developing and managing web applications is achieved, which aligns with the needs of modern businesses and the capabilities of advanced web technologies. These UIs can be independently deployed and seamlessly integrated into larger host applications. The developed payments UI feature can be utilized across multiple applications within an organization or even across organizations.

Figure 2:
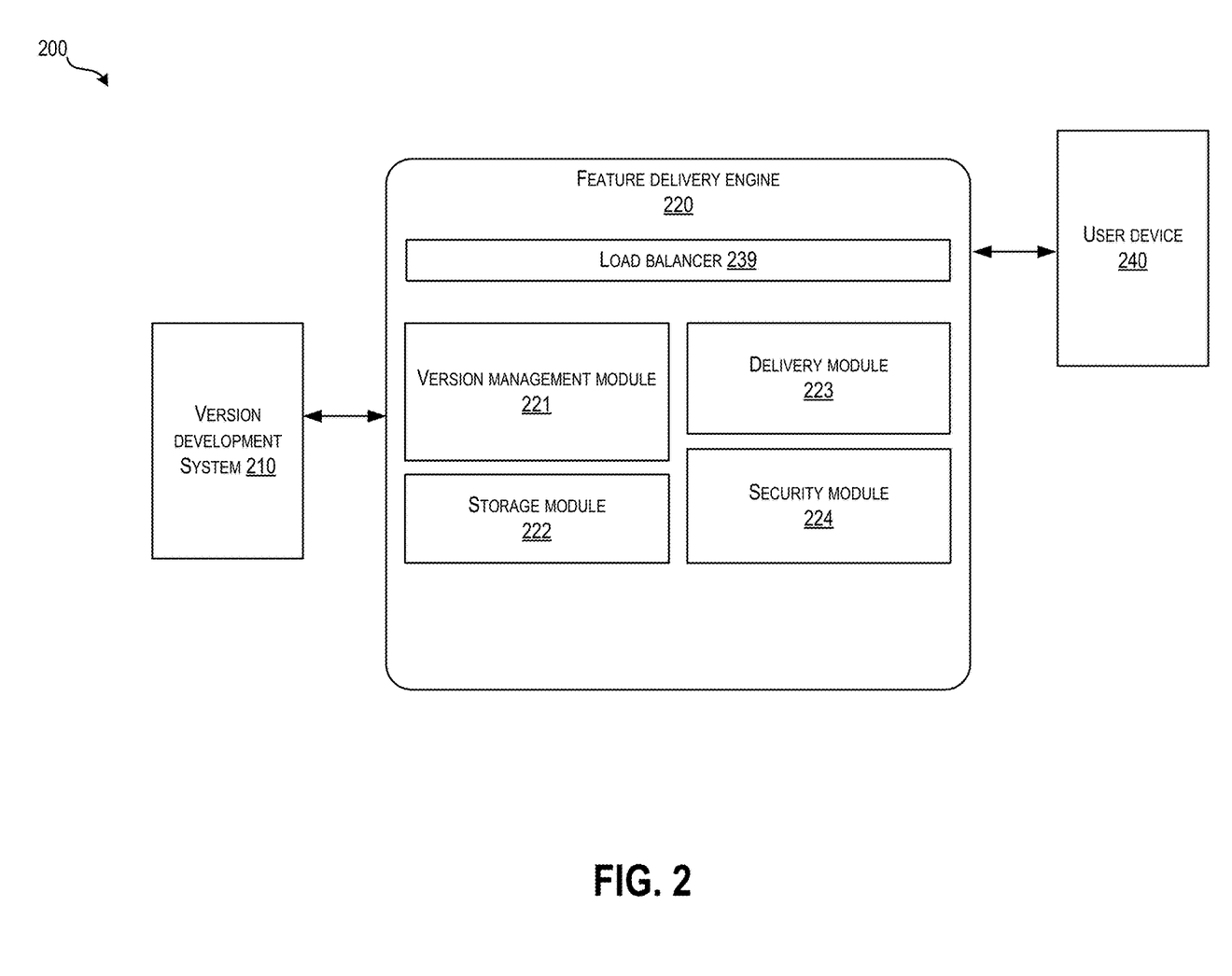
FIG. 2 is an example architecture, 200, in accordance with at least one embodiment.

FIG. 2 is an example framework, 200, in accordance with at least one embodiment. The framework 200 may include a version development system 210, a feature delivery engine 220, and a user device 240.

The user device 240 may be similar to the user device 140 or the user device 141 described above. The user device 240 may be capable of receiving one or more applications and executing those applications. The applications may contain code, which when executed by the user device, causes one or more modular features to be accessed from a cloud platform environment. The user device 240 may make requests to the feature delivery engine 220.

The version development system 210 may be a system in which one or more versions of a specific feature may be developed. The version development system 210 may allow for the testing, resolving dependencies of a particular feature, accessing feature libraries, accessing assets, etc. This version development system 210 may be an enterprise platform, such as enterprise platform 110. The version development system may support activities to ensure that the features are compatible and ready for deployment. The version development system 210 may enable developers to create and modify different versions of a specific feature. This may include writing code, integrating with existing systems/code/database/dependencies, and ensuring that new versions meet required specifications (e.g., security, UI requirements, etc.). The version development system 210 may allow developers to identify, manage, and resolve dependencies between different features and external libraries. This may ensure that all necessary components are compatible and function correctly together. In some examples, an artificial intelligence module may be included in the version development system 210. The artificial intelligence module may ensure that features being developed meet one or more requirements. For example, the AI module may render a feature, make changes to the code of a feature to ensure that the feature is consistent with internal enterprise requirements or external requirements (e.g., security, regional versions, disabling or enabling aspects of the code), and make those changes and/or identify required changes to the code. For example, the artificial intelligence module may make changes to the color, size, font, security, encryption, etc. of one or more features. Further, each feature may have different requirements and the artificial intelligence module may vary how it checks a feature based on the varying requirements.

In addition to code libraries, the system may allow developers to access various assets required for feature development. This may include multimedia files, configuration files, and other resources essential for building comprehensive features. The version development system 210 may integrate with version control systems to track changes, maintain version histories, and manage branches. This may allow developers to work collaboratively, merge changes, and revert to previous versions if necessary.

The feature delivery engine 220 may be a system responsible for handling the delivery of software features. It may ensure that features are correctly managed, stored, and delivered to the appropriate destinations while maintaining security and version control. The feature delivery engine may receive multiple requests, and provide the proper version and/or feature responsive to a request that it receives. In some examples, this may include versions which correspond to geographical variations.

The load balancer 239 may be a part of the feature delivery engine 220. It distributes incoming network traffic across multiple servers and resources within the system to optimize resource use, reduce latency, and ensure high availability. The load balancer ensures that the system can handle high traffic volumes and maintain performance under load.

The version management module 221 may be responsible for managing different versions of software features. It may track changes, maintain version histories, and ensure that the correct version of a feature is delivered to the right environment. This module may enable rollbacks to previous versions if needed and may support the seamless deployment of updates.

The storage module 222 may handle the storage of software features and related data. It may ensure that features may be stored securely and can be retrieved efficiently when needed. The storage module supports various storage mechanisms, including databases and file systems, and ensures data redundancy and integrity. For example, the storage module may use a relation database such as MySQL or PostgreSQL. NoSQL databases may be used, such as MongoDB, Cassandra, Redis (an in-memory data structure which may be used as a database, cache, and message broker). File systems may include a distributed file system (e.g., Hadoop Distributed File System (HDFS)), a network file system (NFS), or a local file system. Versioning systems may include version control systems, object storage with versioning, or file versioning systems. Each feature may be stored as a singular and modular file, wherein the code of the feature is encapsulated.

The delivery module 223 may be responsible for the deployment of features to target environments (e.g., the user device 240). The delivery module 223 may manage the distribution process, ensuring that features are delivered accurately and efficiently to their intended destinations. The delivery module 223 may handle the scheduling and execution of deployments and/or transmission of features.

The security module 224 ensures that all aspects of the feature delivery process are secure. It implements security protocols and measures to protect data and features during storage, transmission, and deployment. The security module 224 may manage access controls, encryption, and other security mechanisms to safeguard the integrity and/or confidentiality of the features.

Figure 3:
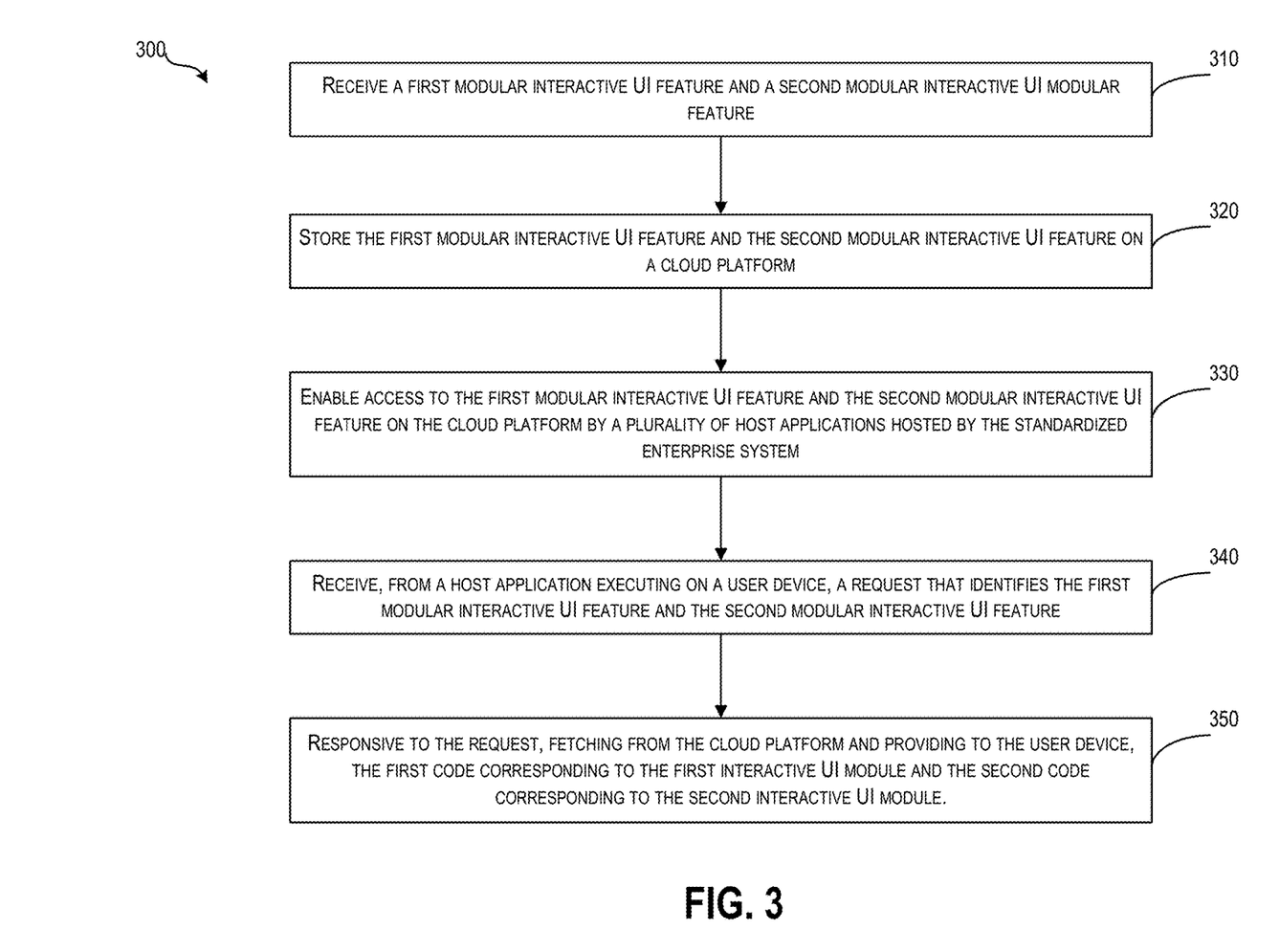
FIG. 3 is an example flow illustrating a process for storing modularized UI features on a cloud environment, 300, in accordance with at least one embodiment.

FIG. 3 is a block diagram illustrating an example method 300 render a user interface (UI) with modularized components on a user device, in accordance with at least one embodiment. A non-transitory computer-readable storage medium may store computer-executable instructions that, when executed by at least one processor, cause at least one computer to perform instructions comprising the operations of the method 300. It should be appreciated that the operations of the method 300 may be performed in any suitable order, not necessarily the order depicted in FIG. 3. Further, the method 300 may include additional, or fewer operations than those depicted in FIG. 3. In some embodiments, method 300 may be executed by components described with respect to FIG. 1A or FIG. 5.

At process block 310, a first modular interactive UI feature and a second modular interactive UI feature may be received at a computing system. The computing system may be a cloud environment. The first modular interactive UI feature may contain a first code. Similarly, the second modular interactive UI feature may comprise a second code that is executable independent of the first code. The first modular interactive UI feature may be configured to perform a first function and render a first user interface. Similarly, the second modular interactive UI feature may be configured to perform a second function that is distinct from the first function, and to render a second user interface. The first modular interactive UI feature and the second modular interactive UI feature may be configured to be a part of a first application. The first modular interactive UI feature and the second modular interactive UI feature may be associated with a standardized enterprise system.

For example, the first modular interactive UI feature may be similar to the feature 134. The second modular interactive UI feature may be similar to the feature 135. The feature 134 and the feature 135 may both be received at the cloud platform 130 from the enterprise platform 110.

At process block 320, the first modular interactive UI feature and the second modular interactive UI feature may be stored on a cloud platform. The cloud platform may be similar to the cloud platform 130 described above.

At process block 330, access to the first modular interactive UI feature and the second modular interactive UI feature on the cloud platform may be enabled. The access may be enabled or provided to a plurality of host applications hosted by the standardized enterprise system. For example, the host applications may be any of the applications 160-165 which may be hosted on the application server 120.

At process block 340, a request may be received at a cloud platform from a host application which may be executing on a user device. For example, the application 160 executing on the user device 140 may transmit a request, which may be received by the cloud platform 130 through, for example, an API request. The request may be received at the load balancer 139. Similarly, the application 164 which may be executing on the user device 141 may also transmit a request which may be received by the cloud platform 130. The request may identify one or more features related to and/or integrated into the respective application(s). For example, the application 164 may configure in its request the feature 134 and the feature 136. Similarly, the application 160 may configure in its request the features 134, 135, and 137.

At process block 350, responsive to the request, the first code corresponding to the first interactive UI module and the second code corresponding to the second interactive UI module may be fetched from the cloud platform and provided to the user device. For example, the first code may cause the host application to generate the first user interface and enable the first function and the second code may cause the host application to generate the second user interface and enable the second function. Additional features may be included based on the host application being executed on the user device. For example, the user device 140 may execute application 160 which may include the features 134, 135, and the feature 137. The user device 141 may execute the application 164, which may include and execute the code for the features 134 and 136.

The features may further provide one or more functions. The one or more functions may be executed in connection with one or more computing devices (e.g., servers 174-176). In some examples, one feature may require communication with multiple servers.

Figure 4:
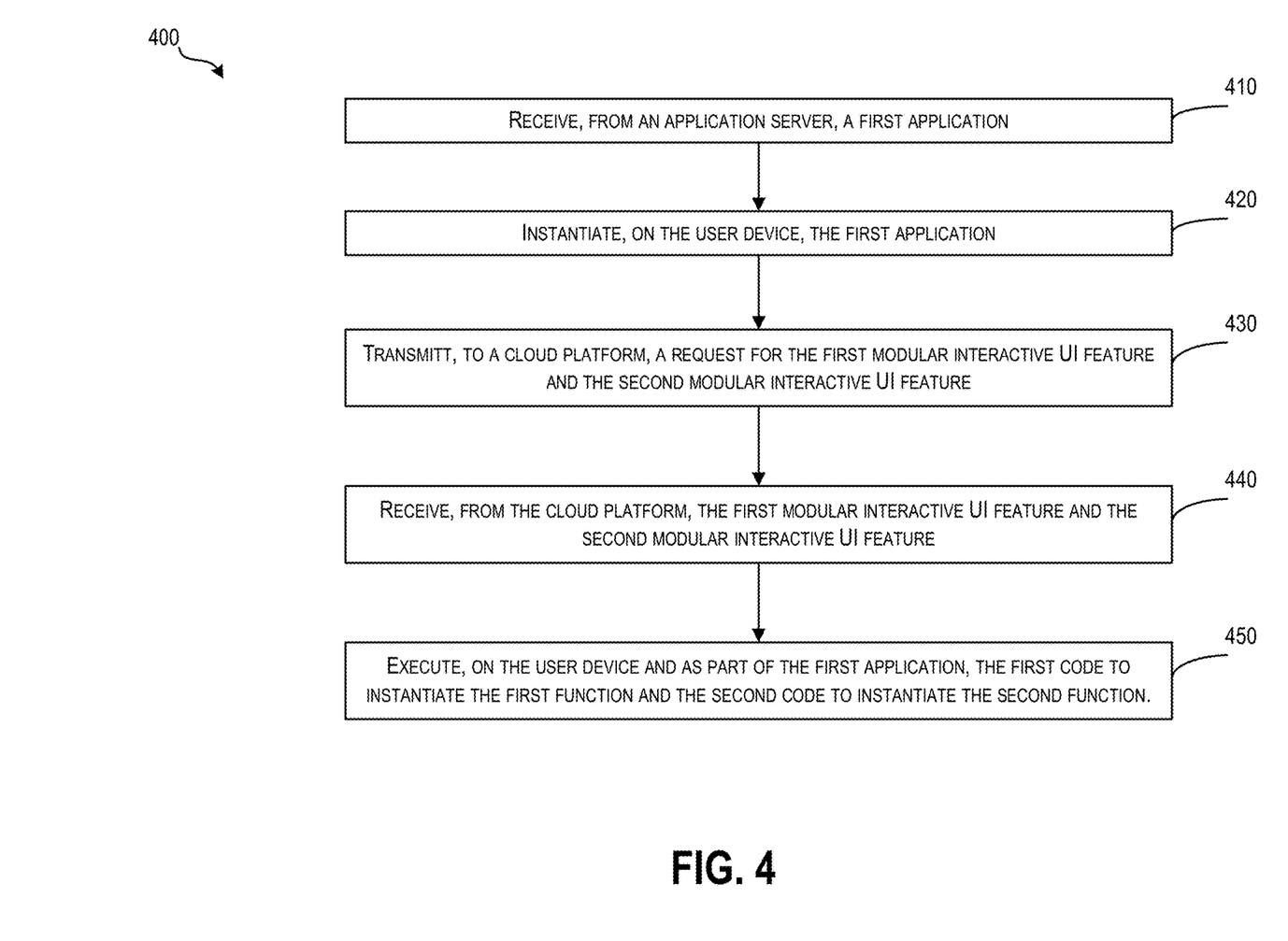
FIG. 4 is an example flow illustrating a process for executing modularized UI features, 400, in accordance with at least one embodiment.

FIG. 4 is a block diagram illustrating an example method 400 render a user interface (UI) with modularized components on a user device, in accordance with at least one embodiment. A non-transitory computer-readable storage medium may store computer-executable instructions that, when executed by at least one processor, cause at least one computer to perform instructions comprising the operations of the method 400. It should be appreciated that the operations of the method 400 may be performed in any suitable order, not necessarily the order depicted in FIG. 4. Further, the method 400 may include additional, or fewer operations than those depicted in FIG. 4. In some embodiments, method 400 may be executed by components described with respect to FIG. 1 or FIG. 5.

At process block 410, a first application may be received at a user device from an application server. The first application may contain code to render a user interface. The first application may also contain code and/or references to a first modular interactive UI feature and a second modular interactive UI modular feature. The first modular interactive UI feature may contain first code and the second modular interactive UI feature may contain second code. The first code and the second code may be executable independent of one another. The first modular interactive UI feature may be configured to perform a first function. Similarly, the second modular interactive UI feature may be configured to perform a second function that is distinct from the first function.

At process block 420, the first application may be instantiated on the user device. For example, the application 160 may be executed on the user device 140. A different user device, e.g., user device 141, may execute the application 164.

At process block 430 a request for the first modular interactive UI feature and the second modular interactive UI feature may be transmitted from the user device to the cloud platform. For example, the user device 140 may execute a request to receive the features 134-137. The user device 141 may execute a similar request for the features 134 and 136.

At process block 440, the first modular interactive UI feature and the second modular interactive UI feature may be received from the cloud platform at the user device. Each modular UI feature may be configured to provide a function which may be distinct from the functionality provided by the other modular UI feature. For example, a first modular interactive UI feature may be related to performing payments while a second modular UI interactive feature may be related to performing authentication of a user. Each modular UI interactive feature may be reused across applications to provide a more consistent UI experience for an end user.

At process block 450. the first code to instantiate the first function and the second code to instantiate the second function may be executed on the user device and as part of the first application. The execution of the code may cause the rendering of the user interfaces on the user device. In some examples, the code may further cause other variations to the user interface. For example, certain code may cause popups, modification to the screen, or cause another application or window to be shown to the user.

In some examples, the execution of a code related to a feature may further include the use of APIs. The APIs may be distributed between the application and the feature.

In some examples, requests made from certain locations, users, and/or user devices may be blocked by the cloud environment. For example, an enterprise may have a policy to block access to certain regions based on regulations and/or laws (e.g., blocking access to countries on an OFAC list). This block may be made at the cloud level. In some examples, certain features with certain functionality may be provided (e.g., providing user identification) but other functionality may be blocked (e.g., performing transactions, wiring money, or performing a blockchain activity).

In some examples, the first modular interactive UI feature and the second modular interactive UI feature may be fetched at the runtime (e.g., upon execution) of the host application. The request may be transmitted to a load balancer of a cloud platform. Newer versions of the feature may also be stored at the cloud platform, and provided to the host application and/or user device. The modular interactive UI features may be fetched using authentication methods, such as token-based authentications. The load balancer may also block certain access if it knows that a feature contains specific elements related to a security vulnerability. Multiple versions of a feature may be stored, which can be rolled back, replaced, selectively provided, or scanned for security vulnerabilities. In some examples, the cloud platform may provide messages to the enterprise if it detects vulnerabilities in one or more of the features which it stores.

In an illustrative example, an application of a banking organization may contain one or more features, which may each relate to an aspect of banking. For example, one feature may relate to a user login, another to verifying an identity of a user, another to performing a financial transaction (e.g., a wire transfer), and another to providing access to certain account information to an external application (e.g., a peer to peer transfer app). Each feature may be independently maintained by a different team within the bank. Each feature may have different requirements in terms of privacy, security, encryption, and/or handling user information. In some examples, each feature may connect to different backend servers to perform functions related to the banking organization. In this manner, a banking organization may maintain an application which may provide various functions. Each function can be configured independently, as an independent module, and provided to a cloud service for distribution. Other applications from the banking organization may also utilize one or more of the modular features used by the application discussed above.

Figure 5:
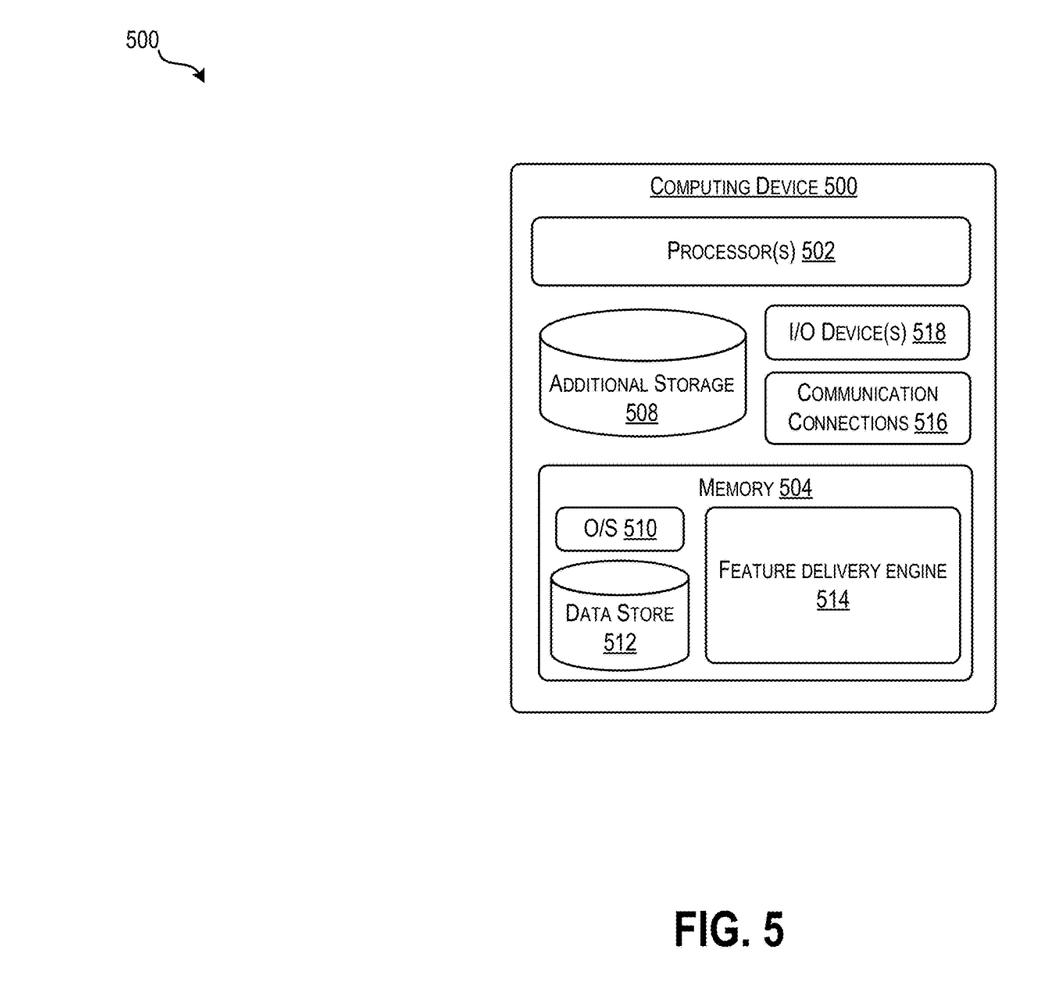
FIG. 5 illustrates an example computing device that may implement the methods disclosed herein.

FIG. 5 illustrates an example computing device 500 that may implement the methods disclosed herein. In some embodiments, the computing device 500 may include one or more processors (e.g., processor(s) 502). The processor(s) 502 may be implemented in hardware, computer-executable instructions, firmware, or combinations thereof. Computer-executable instruction or firmware implementations of the processor(s) 502 may include computer-executable or machine-executable instructions written in any suitable programming language.

Computing device 500 may include memory 504. The memory 504 may store computer-executable instructions that are loadable and executable by the processor(s) 502, as well as data generated during the execution of these programs. The memory 504 may be volatile (such as RAM) and/or non-volatile (such as ROM, flash memory, etc.). The computing device 500 may include additional storage 506, which may include removable storage and/or non-removable storage. The additional storage 506 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 504 or additional storage 506 may individually, or collectively, include multiple different types of memory, such as SRAM, DRAM, or ROM.

The memory 502 and/or additional storage 504 may be examples of computer-readable storage media. Computer-readable storage media may include volatile, or non-volatile, removable or non-removable media implemented in any method or technology for storage of information such as computer-readable instructions, data structures, program modules, or other data. In some embodiments, memory 502 and the additional storage 504 are examples of computer storage media. Memory 502 and/or additional storage 504 may include, but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing device 500. Combinations of any of the above should also be included within the scope of computer-readable media. Computer-readable media may include computer-readable instructions, program modules, or other data transmitted within a data signal, such as a carrier wave, or other transmission. However, as used herein, computer-readable storage media does not include computer-readable communication media.

The memory 504 may include an operating system 508 and one or more data stores 510, a feature delivery engine 514 and/or one or more application programs, modules, or services for implementing the features disclosed herein. In some examples, the feature delivery engine 514 may be similar to the feature delivery engine 220 described above with respect to FIG. 2. In some examples, the feature delivery engine may be implemented on a server, a combination of server computing devices, and/or at a user device. In some examples, the feature delivery engine 514 may be instantiated and executed on a cloud environment. Multiple instances of the feature delivery engine 514 may be generated within multiple cloud environments and/or within multiple virtual machines. The feature delivery engine 514 may ensure that features are correctly managed, stored, and delivered to the appropriate destinations while maintaining security and version control. The feature delivery engine 514 may include storage, delivery, version management, and security capabilities.

The computing device may also contain communications connection(s) 516 that allow the computing device 500 to communicate with a stored database, another computing device, a server, user terminals and/or other devices (e.g., via one or more networks, not depicted). The computing device may also include I/O device(s) 518, such as a keyboard, a mouse, a pen, a voice input device, a touch input device, a display, speakers, a printer, etc.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for rendering a user interface (UI) with modularized components, the method comprising:
   receiving a first modular interactive UI feature and a second modular interactive UI modular feature, the first modular interactive UI feature comprising first code and the second modular interactive UI feature comprising second code that is executable independent of the first code, wherein the first modular interactive UI feature is configured to perform a first function and the second modular interactive UI feature is configured to perform a second function that is distinct from the first function;
   storing the first modular interactive UI feature and the second modular interactive UI feature on a cloud platform, the first modular interactive UI feature and the second modular interactive UI feature being associated with a standardized enterprise system;
   enabling access to the first modular interactive UI feature and the second modular interactive UI feature on the cloud platform by a plurality of host applications hosted by the standardized enterprise system;
   receiving, from a host application executing on a user device, a request that identifies the first modular interactive UI feature and the second modular interactive UI feature, the host application comprising host application content and configured to perform the first function and the second function;
   responsive to the request, fetching from the cloud platform and providing to the user device, the first code corresponding to the first modular interactive UI feature and the second code corresponding to the second modular interactive UI feature, wherein the first code causes the host application and enable the first function and the second code causes the host application to enable the second function;
   updating the first modular interactive UI feature on the cloud platform by replacing the first modular interactive UI feature with a new version of the first modular interactive UI feature containing new code;
   receiving, from the host application executing on the user device, an additional request that identifies the first modular interactive UI feature; and
   responsive to the additional request, fetching from the cloud platform and providing to the user device, the new code corresponding to the new version of the first modular interactive UI feature.

2. The method of claim 1 wherein the first modular interactive UI feature and the second modular interactive UI feature can be modified independently of one another on the cloud platform.

3. The method of claim 1, wherein the cloud platform is a public cloud.

4. The method of claim 1, wherein the first modular interactive UI feature and the second modular interactive UI feature are fetched at runtime of the host application via a request received at a load balancer of the cloud platform.

5. The method of claim 1, wherein the first code and the second code are configured to cause an interaction with a backend server to retrieve or send data.

6. The method of claim 1, further comprising verifying the first modular interactive UI feature and the second modular interactive UI feature fetched from the cloud platform using a token-based authentication.

7. The method of claim 1, further comprising blocking, by a load balancer, transmission of the first modular interactive UI feature responsive to an indication received by the cloud platform that the first modular interactive UI feature contains specific features related to a security vulnerability.

8. The method of claim 1, further comprising storing multiple versions of each of the first modular interactive UI feature and the second modular interactive UI feature on the cloud platform.

9. The method of claim 8, further comprising rolling back to a previous version of the first modular interactive UI feature or the second modular interactive UI feature in response to receiving, at the cloud platform, a message indicating a security vulnerability with a current version of the first modular interactive UI feature or a current version of the second modular interactive UI feature.

10. A method for rendering a user interface (UI) with modularized components, the method comprising performing by a user device:
receiving, from an application server and by the user device, a first host application, the first host application comprising code and references to a first modular interactive UI feature and a second modular interactive UI modular feature, the first modular interactive UI feature comprising first code and the second modular interactive UI feature comprising second code that is executable independent of the first code, wherein the first modular interactive UI feature is configured to perform a first function and the second modular interactive UI feature is configured to perform a second function that is distinct from the first function;
instantiating, on the user device, the first host application;
transmitting, to a cloud platform, a request for the first modular interactive UI feature and the second modular interactive UI feature, the request based on the code of the first host application;
receiving, from the cloud platform and by the user device, the first modular interactive UI feature and the second modular interactive UI feature;
executing, on the user device and as part of the first host application, the first code to provide the first function and the second code to provide the second function;
updating the first modular interactive UI feature on the cloud platform by replacing the first modular interactive UI feature with a new version of the first modular interactive UI feature containing new code;
receiving, from the host application executing on the user device, an additional request that identifies the first modular interactive UI feature; and
responsive to the additional request, fetching from the cloud platform and providing to the user device, the new code corresponding to the new version of the first modular interactive UI feature.

11. The method of claim 10, further comprising receiving a user input with respect to the first modular interactive UI feature.

12. The method of claim 11, further comprising transmitting, a request to a first computing system based on the first code, the request to the first computing system transmitted responsive to the user input with respect to the first modular interactive UI feature.

13. A method of claim 10, further comprising:
receiving, from the application server and by the user device, a second host application, the second host application comprising additional code and additional references to a third modular interactive UI feature and a fourth modular interactive UI feature, the third modular interactive UI feature comprising third code and the fourth modular interactive UI feature comprising fourth code that is executable independent of the third code, wherein the third modular interactive UI feature is configured to perform a third function and the fourth modular interactive UI feature is configured to perform a fourth function that is distinct from the third function;
instantiating, on the user device, the second host application;
transmitting, to the cloud platform, an additional request for the third modular interactive UI feature and the fourth modular interactive UI feature, the additional request based on the additional code of the second host application;
receiving, from the cloud platform and by the user device, the third modular interactive UI feature and the fourth modular interactive UI feature; and
executing, on the user device and as part of the second host application, the third code to provide the third function and the fourth code to provide the fourth function.

14. A non-transitory computer-readable medium containing instructions, that when executed by one or more processors, are configured to cause the one or more processors to perform operations comprising:
receiving a first modular interactive user interface (UI) feature and a second modular interactive UI feature, the first modular interactive UI feature comprising first code and the second modular interactive UI feature comprising second code that is executable independent of the first code, wherein the first modular interactive UI feature is configured to perform a first function and the second modular interactive UI feature is configured to perform a second function that is distinct from the first function;
storing the first modular interactive UI feature and the second modular interactive UI feature on a cloud platform, the first modular interactive UI feature and the second modular interactive UI feature being associated with a standardized enterprise system;
enabling access to the first modular interactive UI feature and the second modular interactive UI feature on the cloud platform by a plurality of host applications hosted by the standardized enterprise system;
receiving, from a host application executing on a user device, a request that identifies the first modular interactive UI feature and the second modular interactive UI feature, the host application comprising host application content and configured to perform the first function and the second function; and
responsive to the request, fetching from the cloud platform and providing to the user device, the first code corresponding to the first modular interactive UI feature and the second code corresponding to the second modular interactive UI feature, wherein the first code causes the host application to enable the first function and the second code causes the host application to enable the second function;
updating the first modular interactive UI feature on the cloud platform by replacing the first modular interactive UI feature with a new version of the first modular interactive UI feature containing new code;

receiving, from the host application executing on the user device, an additional request that identifies the first modular interactive UI feature; and responsive to the additional request, fetching from the cloud platform and providing to the user device, the new code corresponding to the new version of the first modular interactive UI feature.

15. The non-transitory computer-readable medium containing instructions of claim 14, the operations further comprising storing multiple versions of each of the first modular interactive UI feature and the second modular interactive UI feature on the cloud platform.

16. The non-transitory computer-readable medium containing instructions of claim 14, wherein the first modular interactive UI feature and the second modular interactive UI feature can be modified independently of one another on the cloud platform.

* * * * *